United States Patent
Xu et al.

(10) Patent No.: US 12,328,280 B2
(45) Date of Patent: Jun. 10, 2025

(54) DEMODULATION REFERENCE SIGNAL TIME DOMAIN BUNDLING

(71) Applicant: QUALCOMM Incorporated, San Diego, CA (US)

(72) Inventors: Huilin Xu, Temecula, CA (US); Chao Wei, Beijing (CN); Jing Lei, San Diego, CA (US); Peter Pui Lok Ang, San Diego, CA (US); Hwan Joon Kwon, San Diego, CA (US); Wanshi Chen, San Diego, CA (US); Peter Gaal, San Diego, CA (US); Hung Dinh Ly, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 17/758,240

(22) PCT Filed: Feb. 13, 2020

(86) PCT No.: PCT/CN2020/074995
§ 371 (c)(1),
(2) Date: Jun. 30, 2022

(87) PCT Pub. No.: WO2021/159362
PCT Pub. Date: Aug. 19, 2021

(65) Prior Publication Data
US 2023/0027316 A1    Jan. 26, 2023

(51) Int. Cl.
*H04W 4/00* (2018.01)
*H04L 5/00* (2006.01)
(Continued)

(52) U.S. Cl.
CPC ......... *H04L 5/0051* (2013.01); *H04L 5/0091* (2013.01); *H04L 25/0224* (2013.01); *H04W 72/23* (2023.01)

(58) Field of Classification Search
CPC . H04L 5/0051; H04L 5/0091; H04L 25/0224; H04L 5/0053; H04W 72/23
(Continued)

(56) References Cited

U.S. PATENT DOCUMENTS 10,129,859 B2   11/2018  Chen et al.
10,952,192 B2   3/2021   Xu et al.
(Continued)

FOREIGN PATENT DOCUMENTS

CN      108809572 A    11/2018
WO      2015017374     2/2015
(Continued)

OTHER PUBLICATIONS

Huawei., et al., "Design of DL/UL DMRS for Data Transmission", 3GPP TSG RAN WG1 Meeting #91, R1-1719444, Reno, USA, Nov. 27-Dec. 1, 2017, Nov. 17, 2017 (Nov. 17, 2017), 15 Pages, the whole document.
(Continued)

*Primary Examiner* — Chuong T Ho
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, information indicating that demodulation reference signal (DMRS) time domain bundling is enabled. The UE may determine a time domain bundling configuration based at least in part on the information indicating that the DMRS time domain bundling is enabled. Accordingly, in some aspects, the UE may perform channel estimation based at least in part on DMRSs
(Continued)

received in different physical downlink control channel monitoring occasions based at least in part on the time domain bundling configuration. Numerous other aspects are provided.

14 Claims, 11 Drawing Sheets

(51) Int. Cl.
    *H04L 25/02* (2006.01)
    *H04W 72/23* (2023.01)
(58) Field of Classification Search
    USPC .................................................. 370/329, 330
    See application file for complete search history.

(56) References Cited

U.S. PATENT DOCUMENTS

| | | |
|---|---|---|
| 2014/0301287 A1 | 10/2014 | Frenne et al. |
| 2018/0176059 A1 | 6/2018 | Medles et al. |
| 2019/0159181 A1 | 5/2019 | Manolakos et al. |
| 2019/0222380 A1 | 7/2019 | Manolakos et al. |
| 2019/0281487 A1 | 9/2019 | Liu et al. |
| 2019/0319757 A1 | 10/2019 | Manolakos et al. |
| 2020/0367242 A1* | 11/2020 | Moon .................. H04L 5/0048 |
| 2020/0412515 A1* | 12/2020 | Xu ........................ H04W 4/70 |
| 2021/0028899 A1* | 1/2021 | Medles ............. H04W 72/0446 |
| 2021/0282172 A1* | 9/2021 | Peng ..................... H04W 72/23 |
| 2022/0190988 A1 | 6/2022 | Ren et al. |
| 2022/0209917 A1* | 6/2022 | Ren ....................... H04L 5/0064 |
| 2022/0338121 A1* | 10/2022 | Fei ........................ H04W 68/00 |

FOREIGN PATENT DOCUMENTS

| | | |
|---|---|---|
| WO | 2017065876 | 4/2017 |
| WO | 2019099738 A1 | 5/2019 |
| WO | 2019204498 A1 | 10/2019 |
| WO | 2020220367 A1 | 11/2020 |

OTHER PUBLICATIONS

International Search Report and Written Opinion—PCT/CN2020/074995—ISA/EPO—Nov. 18, 2020.
Samsung: "DMRS Design for URLLC", 3GPP Draft, R1-1705382, 3GPP TSG RAN WG1 Meeting #88bis, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017, Apr. 2, 2017, XP051243512, 4 pages, Retrieved from the Internet: URL: http://www.3gpp.org/ftp/Meetings_3GPP_SYNC/RAN1/Docs/ [retrieved on Apr. 2, 2017], The Whole Document.
Supplementary European Search Report—EP20919344—Search Authority—The Hague—Oct. 12, 2023.

* cited by examiner

DEMODULATION REFERENCE SIGNAL TIME DOMAIN BUNDLING

CROSS-REFERENCE TO RELATED APPLICATION

This application is a 371 national stage of Patent Cooperation Treaty (PCT) Application No. PCT/CN2020/074995 filed on Feb. 13, 2020, entitled "DEMODULATION REFERENCE SIGNAL TIME DOMAIN BUNDLING," which is hereby expressly incorporated by reference herein.

FIELD OF THE DISCLOSURE

Aspects of the present disclosure generally relate to wireless communication and to techniques and apparatuses for demodulation reference signal (DMRS) time domain bundling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include: receiving, from a base station, information indicating that demodulation reference signal (DMRS) time domain bundling is enabled; determining a time domain bundling configuration based at least in part on the information indicating that the DMRS time domain bundling is enabled; and performing channel estimation based at least in part on DMRSs received in different physical downlink control channel (PDCCH) monitoring occasions based at least in part on the time domain bundling configuration.

In some aspects, a UE for wireless communication may include a memory and one or more processors operatively coupled to the memory. The memory and the one or more processors may be configured to: receive, from a base station, information indicating that DMRS time domain bundling is enabled; determine a time domain bundling configuration based at least in part on the information indicating that the DMRS time domain bundling is enabled; and perform channel estimation based at least in part on DMRSs received in different PDCCH monitoring occasions based at least in part on the time domain bundling configuration.

In some aspects, a non-transitory computer-readable medium may store one or more instructions for wireless communication. The one or more instructions, when executed by one or more processors of a UE, may cause the one or more processors to: receive, from a base station, information indicating that DMRS time domain bundling is enabled; determine a time domain bundling configuration based at least in part on the information indicating that the DMRS time domain bundling is enabled; and perform channel estimation based at least in part on DMRSs received in different PDCCH monitoring occasions based at least in part on the time domain bundling configuration.

In some aspects, an apparatus for wireless communication may include: means for receiving, from a base station, information indicating that DMRS time domain bundling is enabled; means for determining a time domain bundling configuration based at least in part on the information indicating that the DMRS time domain bundling is enabled; and means for performing channel estimation based at least in part on DMRSs received in different PDCCH monitoring occasions based at least in part on the time domain bundling configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect, of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
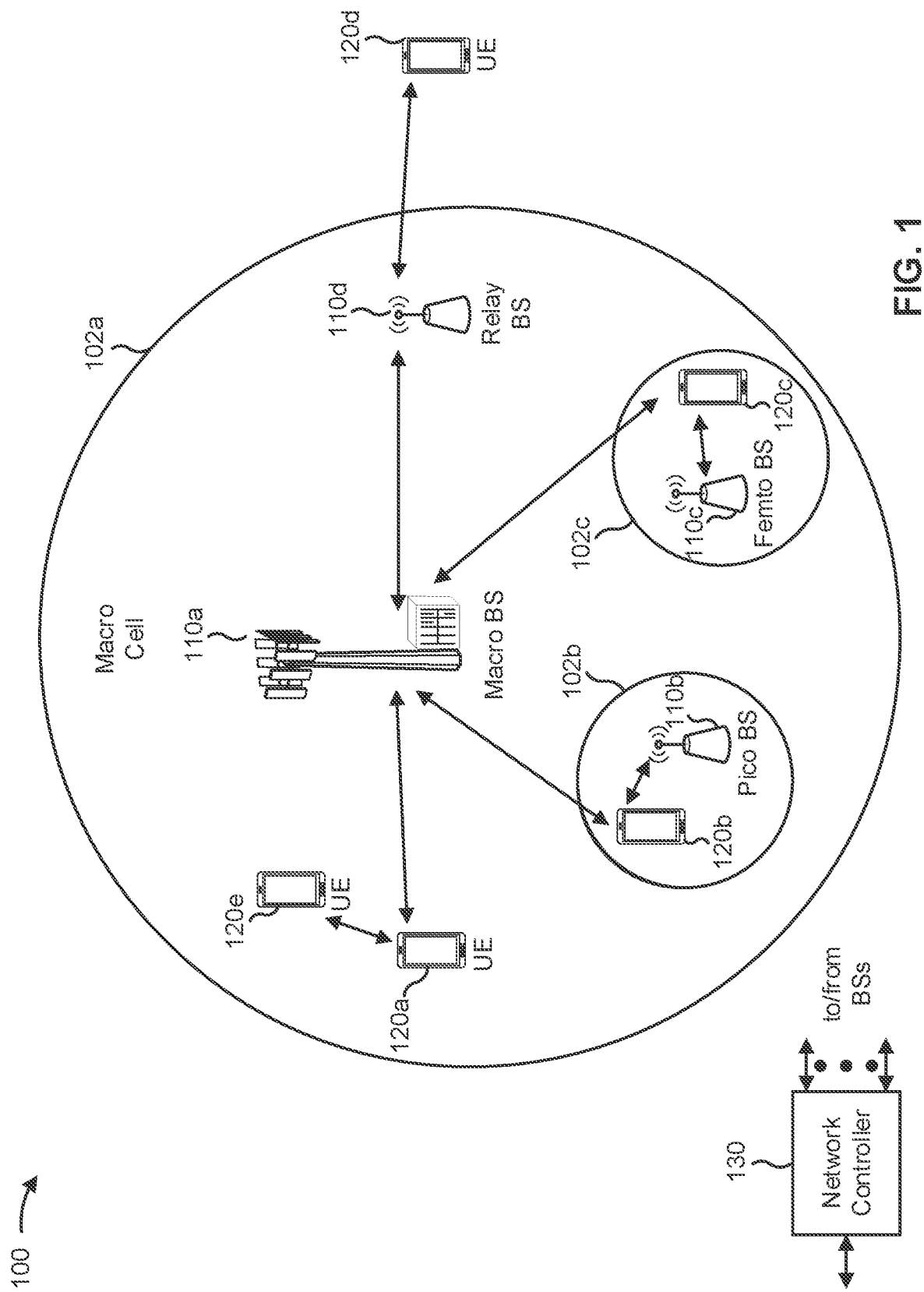
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
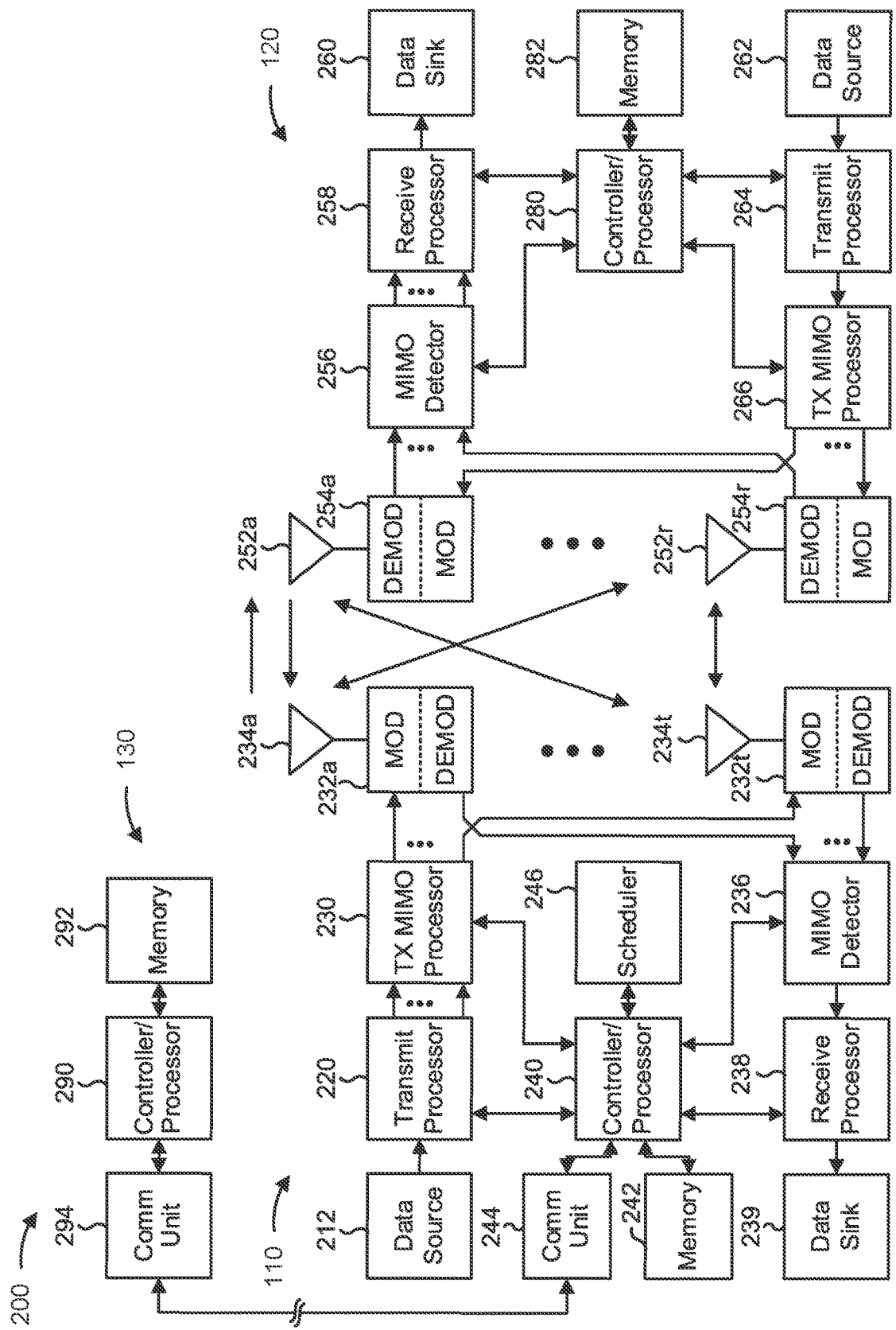
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., preceding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with demodulation reference signal (DMRS) time domain bundling, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4 and/or other processes as described herein. A scheduler 246 may schedule UEs for data transmission on the downlink and/or uplink.

In some aspects, UE 120 may include means for receiving, from base station 110, information indicating that DMRS time domain bundling is enabled, means for determining a time domain bundling configuration based at least in part on the information indicating that the DMRS time domain bundling is enabled, means for performing channel estimation based at least in part on DMRSs received in different physical downlink control channel (PDCCH) monitoring occasions based at least in part on the time domain bundling configuration, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In a wireless network, a UE may perform channel estimation of one or more properties of a downlink (e.g., signal quality, signal strength, and/or the like) between the UE and a base station based at least in part on one or more reference signals transmitted from the base station to the UE. For example, in some aspects, the one or more reference signals may include a DMRS specifically configured for the UE, and the base station may transmit the DMRS within a scheduled set of resources (e.g., time and frequency resources). Accordingly, the base station may transmit, to the UE, information identifying a DMRS port (which may also be referred to as an antenna port) associated with the DMRS transmission, which may specify a resource configuration for a downlink slot in which the DMRS is transmitted. For example, the resource configuration may include information related to a digital MIMO precoder, an analog beamforming filter, a downlink transmit power, and/or other transmission parameters associated with the DMRS. In this way, the UE may use the resource configuration to identify one or more resource elements that carry the DMRS, decode the DMRS, perform the channel estimation, and/or the like.

Furthermore, in some cases, a wireless network may support DMRS bundling in a time domain (e.g., across one or more symbols or slots), which allows a UE to assume phase continuity for the DMRS over aggregated symbols or slots in which the bundled DMRSs are transmitted. For example, when DMRS bundling is enabled or otherwise configured, the UE may perform (joint) channel estimation based at least in part on DMRS(s) received across multiple symbols or slots, as opposed to performing channel estimation separately according to DMRS(s) received in individual symbols, consecutive symbols of the same channel in a slot or slots, and/or the like. In this way, DMRS bundling in the time domain may allow a UE to coherently filter bundled DMRSs received in different symbols or slots, which improves channel estimation accuracy (especially in small bandwidth and/or low mobility scenarios). Accordingly, from a UE perspective, configuring DMRSs to always be bundled across different physical downlink control channel (PDCCH) monitoring occasions may be preferable to permit the UE to achieve a maximum coherent processing gain. However, a network typically constrains DMRS bundling to a limited time period. For example, a network may dynamically adjust PDCCH transmission parameters (e.g., a digital preceding matrix, analog beamforming filter, downlink power, and/or the like) to improve performance for a specific UE, which may cause phase continuity of the PDCCH DMRS to be broken between monitoring occasions.

Some aspects described herein relate to techniques and apparatuses to bundle DMRSs in a time domain to enable a UE to perform joint channel estimation based at least in part on bundled DMRSs that are received in different symbols or slots (e.g., different PDCCH monitoring occasions) while also providing a base station with flexibility to dynamically adjust downlink transmission parameters to improve performance for the UE. For example, in some aspects, UE-specific PDCCH monitoring occasions may be distinguished from cell-specific monitoring occasions, and permanent bundling may be configured for a common search space (CSS) associated with cell-specific PDCCH monitoring occasions that are used to schedule broadcast information transmitted to all UEs within a cell. Additionally, or alternatively, the base station may configure a periodic pattern to define a bundle that includes different PDCCH monitoring occasions in which DMRSs are bundled, provide dynamic signaling to indicate whether and/or when to reset PDCCH DMRS bundling, combine a PDCCH DMRS bundling configuration with a PDCCH repetition configuration, jointly configure PDCCH DMRS bundling and physical downlink shared channel (PDSCH) bundling, and/or the like. In this way, some aspects described herein may provide various DMRS bundling configurations to balance tradeoffs between enabling the UE to perform joint channel estimation using bundled DMRSs that are received in different monitoring occasions while also providing a network with flexibility to reset DMRS bundling to adapt downlink transmission parameters.

FIGS. 3A-3H are diagrams illustrating one or more examples 300 of DMRS time domain bundling, in accordance with various aspects of the present disclosure. As shown in FIGS. 3A-3H, example(s) 300 include a UE (e.g., UE 120) in communication with a base station (e.g., base station 110) over a wireless network (e.g., wireless network 100). Furthermore, as described herein, the base station may provide the UE with information related to a DMRS bundling configuration to indicate when DMRSs are bundled across different PDCCH and/or PDSCH monitoring occasions such that the UE can assume phase continuity for the bundled DMRSs. Furthermore, as described herein, the base station may provide the UE with information to indicate when DMRS bundling is to be reset, to allow the base station to adapt transmission parameters.

Figure 3A:
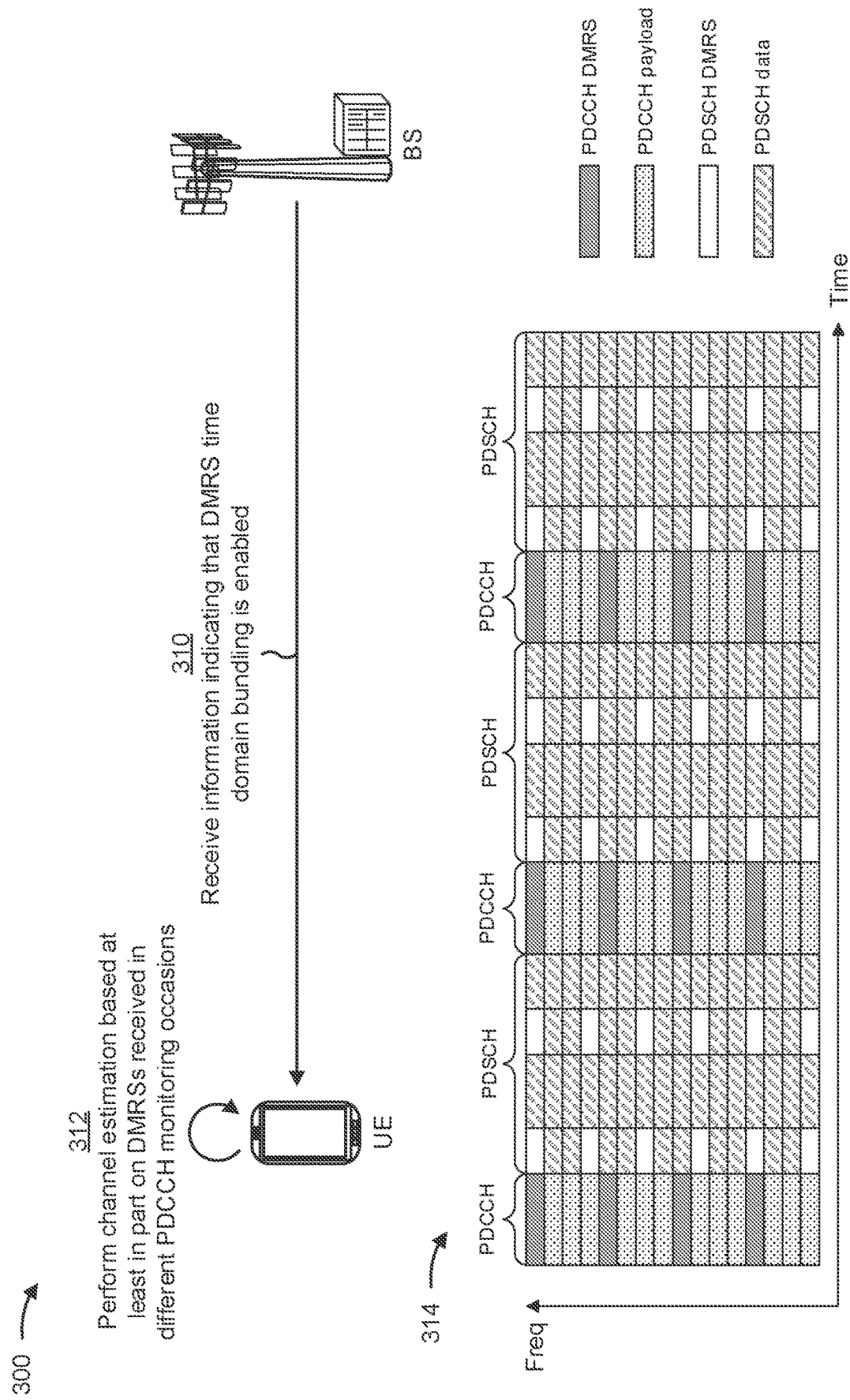
FIGS. 3A-3H are diagrams illustrating one or more examples of demodulation reference signal time domain bundling, in accordance with various aspects of the present disclosure.

As shown in FIG. 3A, and by reference number 310, the base station may transmit, and the UE may receive, information indicating that DMRS time domain bundling is enabled. Furthermore, in some aspects, the information indicating that DMRS time domain bundling is enabled may include a time domain bundling configuration provided in semi-static downlink signaling, such as a radio resource control (RRC) signaling, dynamic downlink signaling, such as a medium access control (MAC) control element (MACS-CE) or downlink control information (DCI), and/or the like. For example, as described in further detail below with reference to FIG. 3B, the time domain bundling configuration may enable permanent PDCCH DMRS time domain bundling for a CSS associated with cell-specific PDCCH monitoring occasions that the base station uses to schedule broadcast information. Additionally, or alternatively, as described in further detail below with reference to FIGS. 3C-3F, the time domain bundling configuration may include a semi-static and/or dynamic time domain bundling configuration that indicate a bundling of PDCCH DMRSs across different UE-specific PDCCH monitoring occasions, whether to reset the PDCCH DMRS bundling, and/or the like. Additionally, or alternatively, as described in further detail below with reference to FIGS. 3G-3H, the time domain bundling configuration may include a joint bundling configuration for a PDCCH DMRS and a PDSCH DMRS, a bundling relationship between a PDCCH DMRS and a PDSCH DMRS, and/or the like.

As further shown in FIG. 3A, and by reference number 312, the UE may perform channel estimation for a downlink between the base station and the UE based at least in part on DMRSs that are received in different PDCCH monitoring occasions. For example, as described in further detail herein, the UE may determine the time domain bundling configuration to be applied over the different PDCCH monitoring occasions based at least in part on the information indicating that DMRS time domain bundling is configured, and the UE may perform the channel estimation based at least in part on the time domain bundling configuration. For example, as shown by reference number 314, a downlink resource configuration for the UE may include a set of time and frequency resources in which the base station transmits downlink signals to the UE. For example, the downlink resource configuration includes a set of PDCCH monitoring occasions, each of which includes a set of symbols or slots in which the base station transmits a PDCCH DMRS using a first set of frequency resources and further in which the base station transmits a PDCCH payload using a second set of frequency resources. Furthermore, the downlink resource configuration includes a set of PDSCH monitoring occasions, some of which include a set of symbols or slots in which the base station transmits a PDSCH DMRS and each of which includes a set of symbols or slots in which the base station transmits PDCCH data. Accordingly, as described herein, the UE may perform channel estimation for the downlink from the base station according to the time domain bundling configuration to be applied to DMRSs received in different monitoring occasions (e.g., different PDCCH and/or PDSCH monitoring occasions).

Figure 3B:
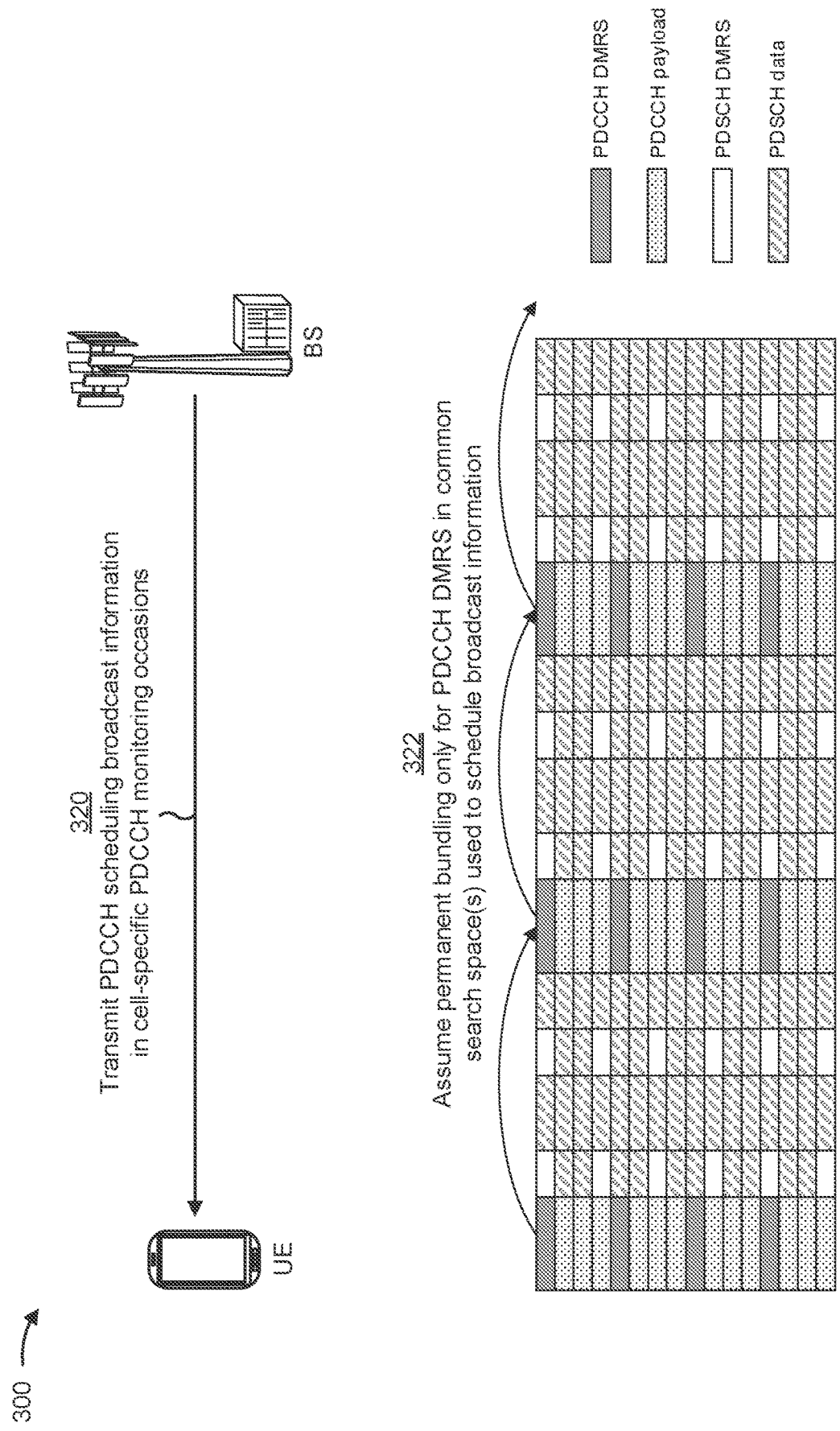

As shown in FIG. 3B, and by reference number 320, the base station may transmit, and the UE may receive, a PDCCH in cell-specific PDCCH monitoring occasions. For example, in some aspects, the PDCCH transmitted in the cell-specific monitoring occasions may be used to schedule broadcast information transmitted to all UEs in a cell associated with the base station. In this case, as shown by reference number 322, the UE may assume a permanent bundling configuration only for PDCCH DMRSs that are transmitted in a CSS used to schedule broadcast information. For example, although permanently bundling a PDCCH DMRS over time may be infeasible for a PDCCH that is specifically configured for the UE because the base station may adapt downlink transmission parameters to improve downlink performance for the UE, a time domain bundling configuration may distinguish UE-specific PDCCH monitoring occasions from cell-specific PDCCH monitoring occasions. Accordingly, because transmission parameters for the cell-specific PDCCH monitoring occasions are generally static (or semi-static) over time to enable different UEs to detect and decode cell-wide information that the base station broadcasts in the cell-specific PDCCH monitoring occasions, the UE may assume that PDCCH DMRS time domain bundling is permanent across cell-specific PDCCH monitoring occasions when PDCCH DMRS time domain bundling is enabled. For example, in some aspects, the permanent bundling configuration may be applied to a Type1-PDCCH CSS without a dedicated RRC configuration (e.g., related to random access), a Type0-PDCCH CSS (e.g., used for scheduling a system information block type 1 (SIB1)), a Type0A-PDCCH CSS (e.g., used for scheduling other system information blocks), a Type2-PDCCH CSS (e.g., used for paging), and/or the like.

Figure 3C:
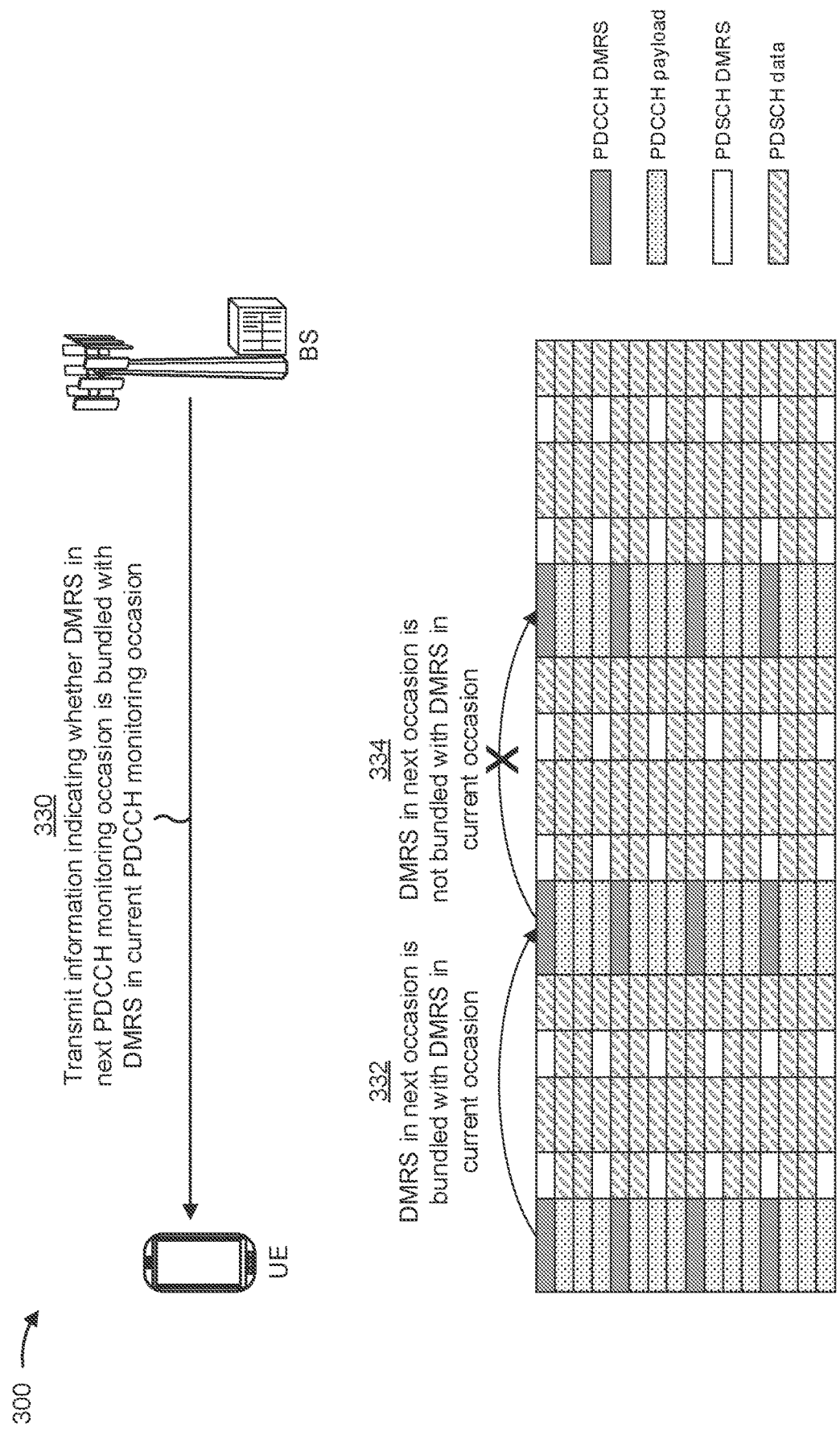

As shown in FIG. 3C, and by reference number 330, the base station may transmit, and the UE may receive, information indicating whether a DMRS in a next UE-specific PDCCH monitoring occasion is bundled with a DMRS in a current UE-specific PDCCH monitoring occasion. For example, in the current PDCCH monitoring occasion, the base station may transmit a PDCCH that includes a field (e.g., in DCI) to indicate whether the DMRS in the next PDCCH monitoring occasion is bundled with the DMRS in the current PDCCH monitoring occasion.

For example, as shown by reference number 332, the base station may configure the field in the PDCCH to indicate that the DMRS in the next PDCCH monitoring occasion is bundled with the DMRS in the current PDCCH monitoring occasion. In this way, the UE may assume phase continuity for the PDCCH DMRS from the current PDCCH monitoring occasion to the next PDCCH monitoring occasion, and perform joint channel estimation based at least in part on the PDCCH DMRSs received in the current and next PDCCH monitoring occasions. Furthermore, in some aspects, the base station may configure the field in the PDCCH to indicate a number of subsequent PDCCH monitoring occasions in which the PDCCH DMRS is bundled with the PDCCH DMRS in the current PDCCH monitoring occasion. In this case, the UE may perform joint channel estimation based at least in part on the PDCCH DMRS received in the current PDCCH monitoring occasions and the next N PDCCH monitoring occasions, where N is the number of subsequent PDCCH monitoring occasions in which the PDCCH DMRS is bundled with the PDCCH DMRS in the current PDCCH monitoring occasion.

Additionally, or alternatively, as shown by reference number 334, the base station may dynamically reset DMRS time domain bundling by configuring the field in the PDCCH to indicate that the DMRS in the next PDCCH monitoring occasion is not bundled with the DMRS in the current PDCCH monitoring occasion (e.g., by indicating that DMRS time domain bundling is enabled for zero (0) subsequent PDCCH monitoring occasions). In this way, the base station may dynamically change one or more PDCCH transmission parameters for the next PDCCH monitoring occasion. For example, in some aspects, the base station may dynamically reset PDCCH DMRS bundling in order to change a MIMO precoder, a beamforming filter, a transmit power, and/or other parameters associated with a PDCCH transmission to the UE.

Figure 3D:
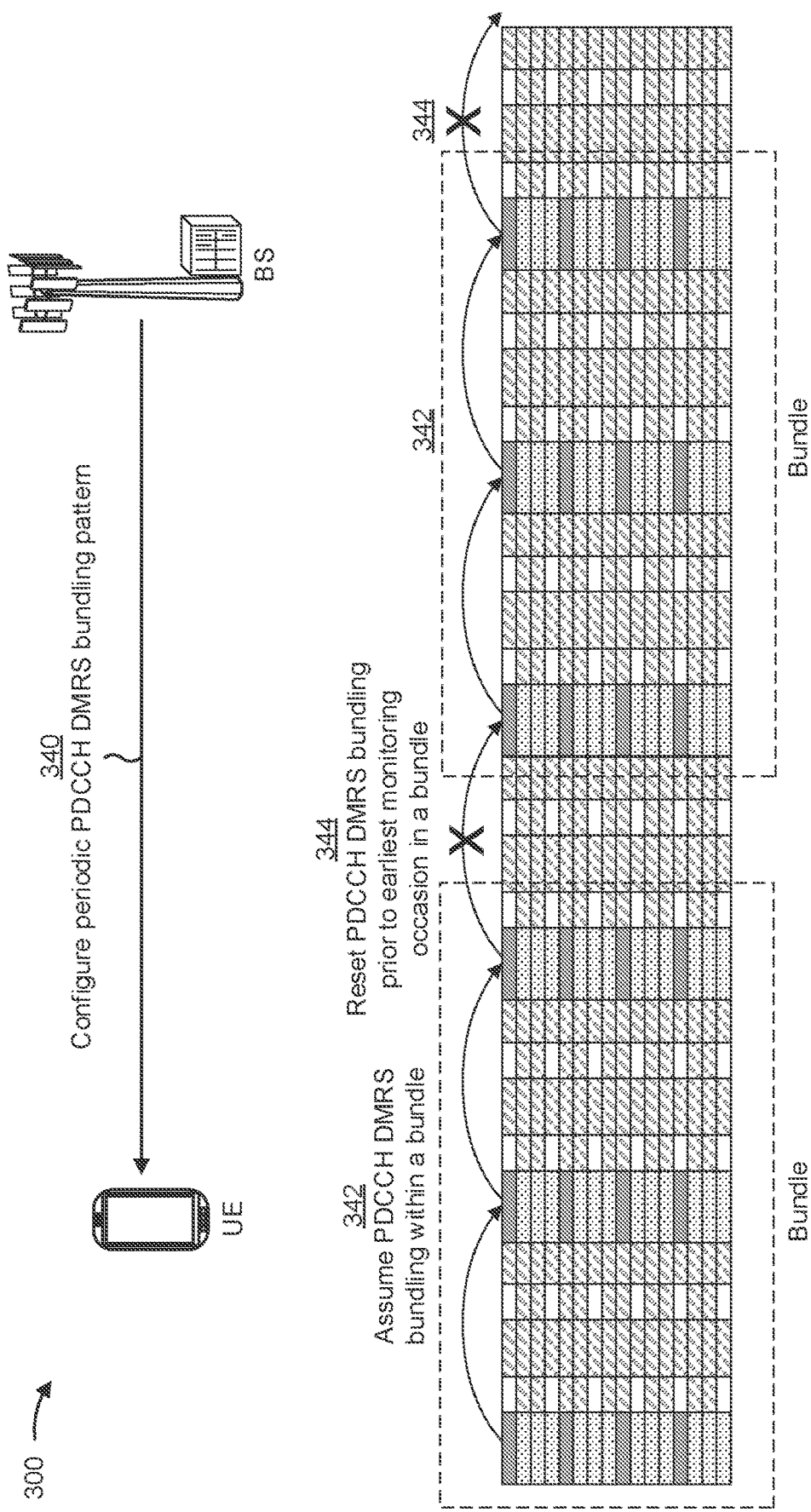

As shown in FIG. 3D, and by reference number 340, the base station may transmit, and the UE may receive, information to configure a periodic PDCCH DMRS bundling pattern. For example, although a dynamic indication of PDCCH DMRS bundling (e.g., as shown in FIG. 3C) may provide a base station with flexibility to dynamically adapt downlink transmission parameters, the dynamic indication may be vulnerable to the UE potentially missing (e.g., failing to receive and/or decode) a PDCCH that includes the dynamic indication. Accordingly, in some aspects, the base station may configure the PDCCH DMRS bundling pattern (e.g. via RRC signaling) to provide a semi-static bundling configuration that may be more robust than the dynamic indication. For example, as shown by reference number 342, the PDCCH DMRS bundling pattern may define a bundle (or bundle window) that includes a quantity of PDCCH monitoring occasions in which PDCCH DMRS time domain bundling is enabled (e.g., in FIG. 3D, a bundle includes three PDCCH monitoring occasions). Furthermore, as shown by reference number 344, time domain bundling for the PDCCH DMRS may be reset prior to an earliest PDCCH monitoring occasion in each bundle.

Figure 3E:
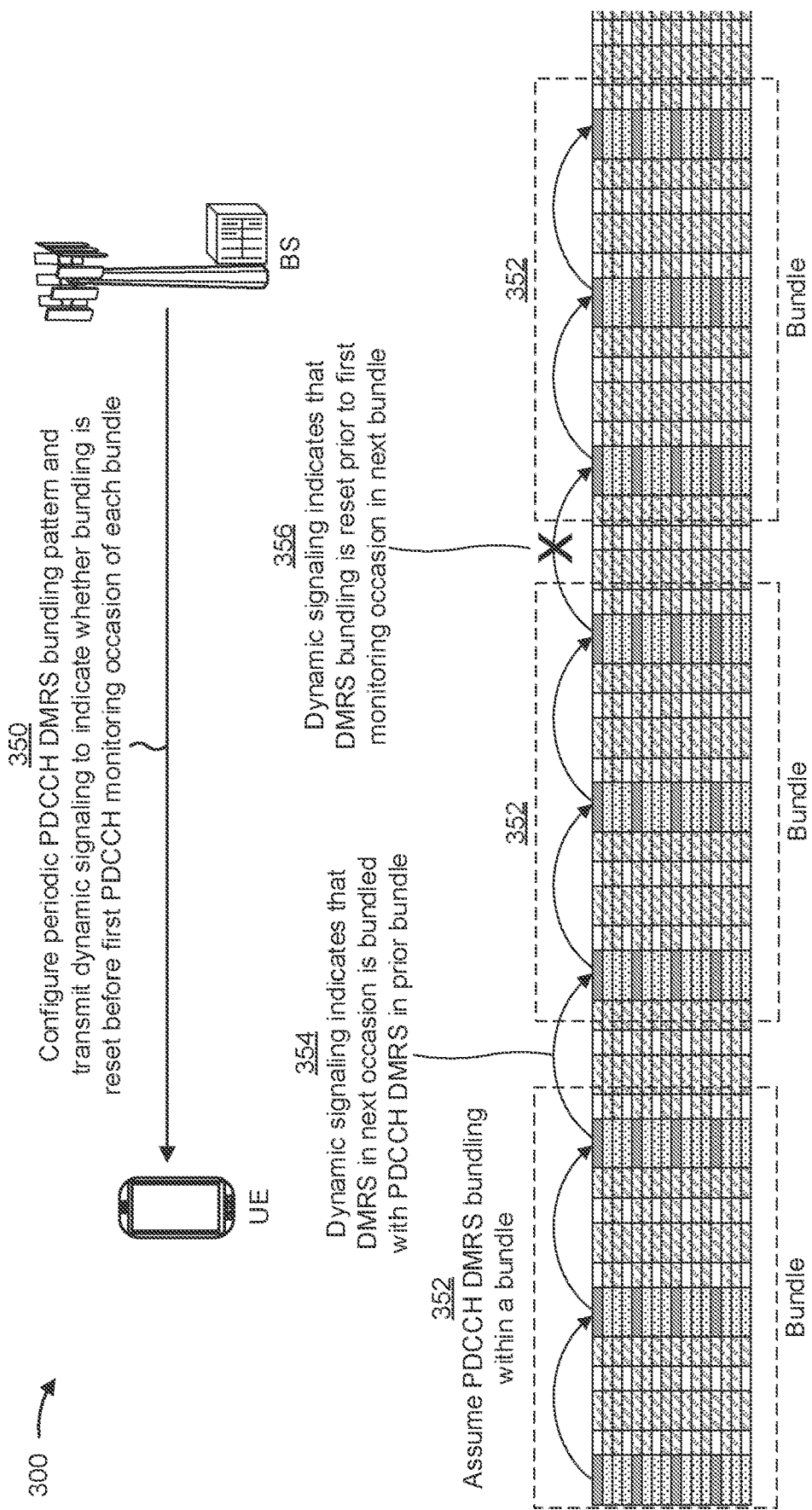

As shown in FIG. 3E, and by reference number 350, the base station may transmit, and the UE may receive, information to configure a semi-static periodic PDCCH DMRS bundling pattern, and the base station may further transmit dynamic signaling to indicate whether bundling is to be reset prior to an earliest monitoring occasion in each bundle. For example, the semi-static periodic PDCCH DMRS bundling pattern may generally be more robust than transmitting a dynamic indication in each PDCCH monitoring occasion, and using a dynamic indication to indicate whether bundling is to be reset prior to the earliest monitoring occasion in each bundle may provide the base station with flexibility to enable DMRS phase continuity across different bundles when there is not a need to adapt PDCCH transmission parameters.

Accordingly, as shown by reference number 352, the PDCCH DMRS bundling pattern may define a bundle (or bundle window) that includes a quantity of PDCCH monitoring occasions in which PDCCH DMRS time domain bundling is enabled in a similar manner as described above with reference to FIG. 3D. Furthermore, the base station may transmit dynamic signaling (e.g., in DCI, a MAC-CE, and/or the like) in a PDCCH monitoring occasion (e.g., a last PDCCH monitoring occasion in a bundle) to indicate whether bundling is to be reset prior to the earliest PDCCH monitoring occasion in the next bundle. For example, as shown by reference number 354, the base station may configure the dynamic signaling to indicate that the PDCCH DMRSs in the next bundle are to be bundled with the PDCCH DMRSs in the current bundle. In this way, the UE may assume phase continuity for the PDCCH DMRSs received in the current bundle and the next bundle. Additionally, or alternatively, as shown by reference number 356, the base station may configure the dynamic signaling to indicate that PDCCH DMRS time domain bundling is to be reset prior to the earliest PDCCH monitoring occasion in the next bundle. In this case, the base station may dynamically change one or more PDCCH transmission parameters for the PDCCH monitoring occasions in the next bundle. Furthermore, in cases where the UE does not receive or is unable to decode the dynamic signaling prior to the earliest PDCCH monitoring occasion in a current bundle, the UE may assume that the PDCCH DMRSs in the current bundle are bundled with the PDCCH DMRSs in the prior bundle. Alternatively, the UE may assume that the PDCCH DMRSs in the current bundle are not bundled with the PDCCH DMRSs in the prior bundle in cases where the UE does not receive or is unable to decode the dynamic signaling prior to the earliest PDCCH monitoring occasion in the current bundle.

Figure 3F:
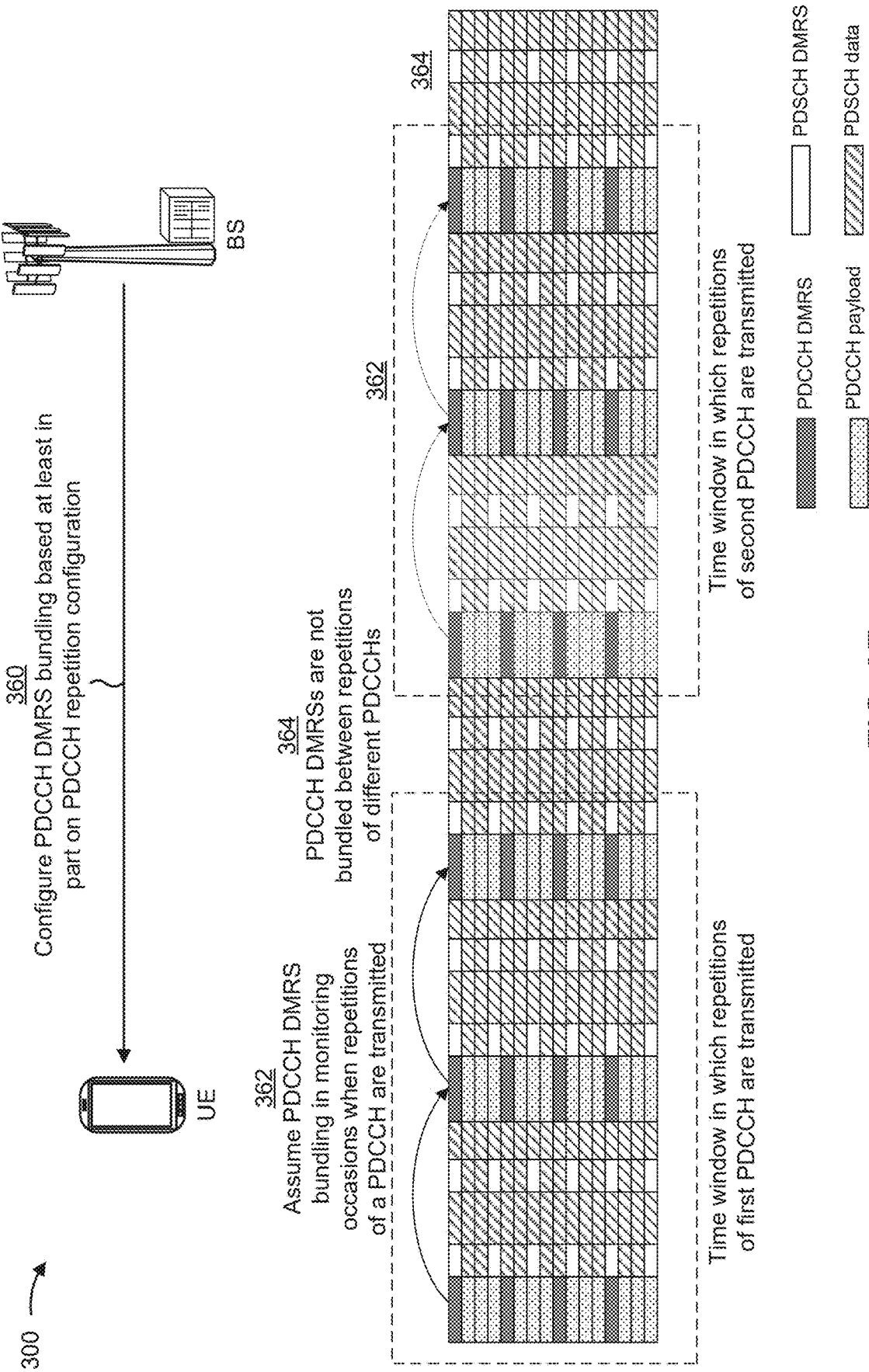

As shown in FIG. 3F, and by reference number 360, the base station may transmit, and the UE may receive, information to configure PDCCH DMRS bundling based at least in part on a PDCCH repetition configuration. For example, in some aspects, the PDCCH repetition configuration may be enabled to improve PDCCH reception and decoding performance for the UE (e.g., in cases where the UE has reduced capabilities such as a limited number of receive antennas, in cases where the UE is located at a cell edge, and/or the like). Accordingly, in cases where the base station configures PDCCH repetition for the UE, the base station may configure PDCCH DMRS bundling based at least in part on the PDCCH repetition configuration because the base station may generally use the same downlink transmission parameters for each PDCCH repetition. For example, as shown by reference number 362, the UE may assume that PDCCH DMRSs are bundled in a time window in which the base station transmits multiple repetitions of the same. Furthermore, as shown by reference number 364, the UE may assume that PDCCH DMRSs are not bundled between time windows that are used to transmit different PDCCHs. Additionally, or alternatively, the base station may provide dynamic signaling (e.g., DCI, a MAC-CE, and/or the like) to explicitly indicate whether there is PDCCH DMRS bundling (and therefore phase continuity) across time windows in which repetitions of different PDCCHs are transmitted or whether PDCCH DMRS bundling is to be reset between time windows in which repetitions of different PDCCHs are transmitted.

Figure 3G:
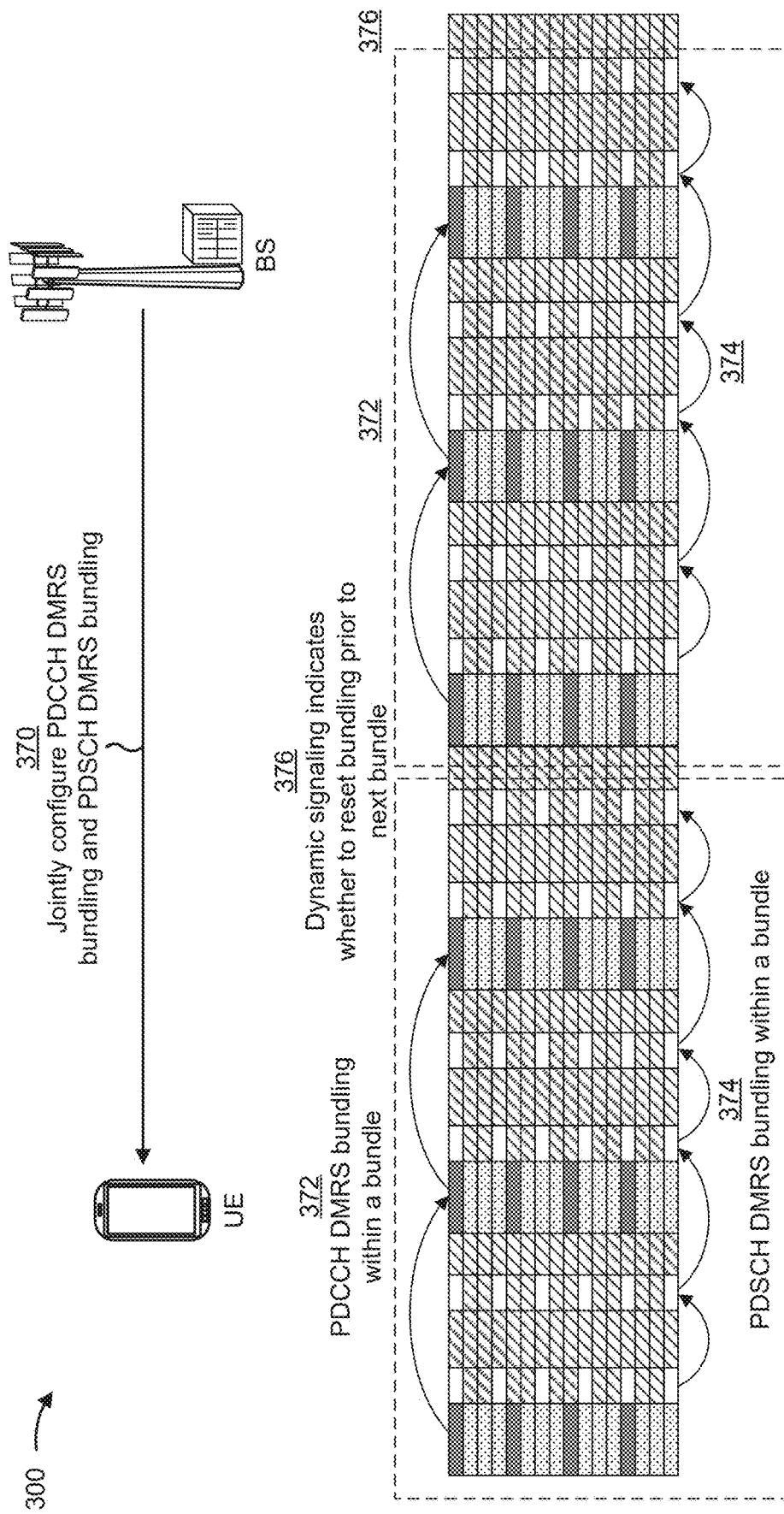

As shown in FIG. 3G, and by reference number 370, the base station may transmit, and the UE may receive, information to jointly configure time domain bundling for a PDCCH DMRS and a PDSCH DMRS to enhance overall downlink performance for the UE (e.g., because the base station may jointly configure a precoder, beamforming filter, and/or other transmission parameters for the PDCCH and PDSCH). For example, when PDCCH DMRS time domain bundling and PDSCH DMRS time domain bundling are both enabled and jointly configured, a dynamic time domain bundling configuration (e.g., indicated in dynamic signaling such as DCI or a MAC-CE) and/or a semi-static time domain bundling configuration (e.g., indicated in semi-static signaling such as an RRC message) may be jointly applied to a PDCCH DMRS and a PDSCH DMRS. For example, the joint configuration may include a semi-static time domain bundling configuration defining a periodic bundling pattern, a dynamic time domain bundling configuration indicating whether time domain bundling is to be reset or maintained across different monitoring occasions or bundles, and/or the like. For example, as shown in FIG. 3G, a semi-static time domain bundling configuration may define a periodic bundling pattern including three PDCCH monitoring occasions in which a PDCCH DMRS is transmitted. Additionally, in FIG. 3G, the periodic bundling pattern includes three PDSCH monitoring occasions, each of which contain two PDSCH DMRS monitoring occasions. Accordingly, as shown by reference number 372, the UE may assume phase continuity for PDCCH DMRSs received in different PDCCH monitoring occasions within a bundle. Similarly, as shown by reference number 374, the UE may assume phase continuity for PDSCH DMRSs received in different PDSCH monitoring occasions within the bundle. Furthermore, as shown by reference number 376, dynamic signaling may indicate whether to reset bundling or maintain phase continuity for PDCCH DMRSs and PDSCH DMRSs transmitted in the next bundle.

Figure 3H:
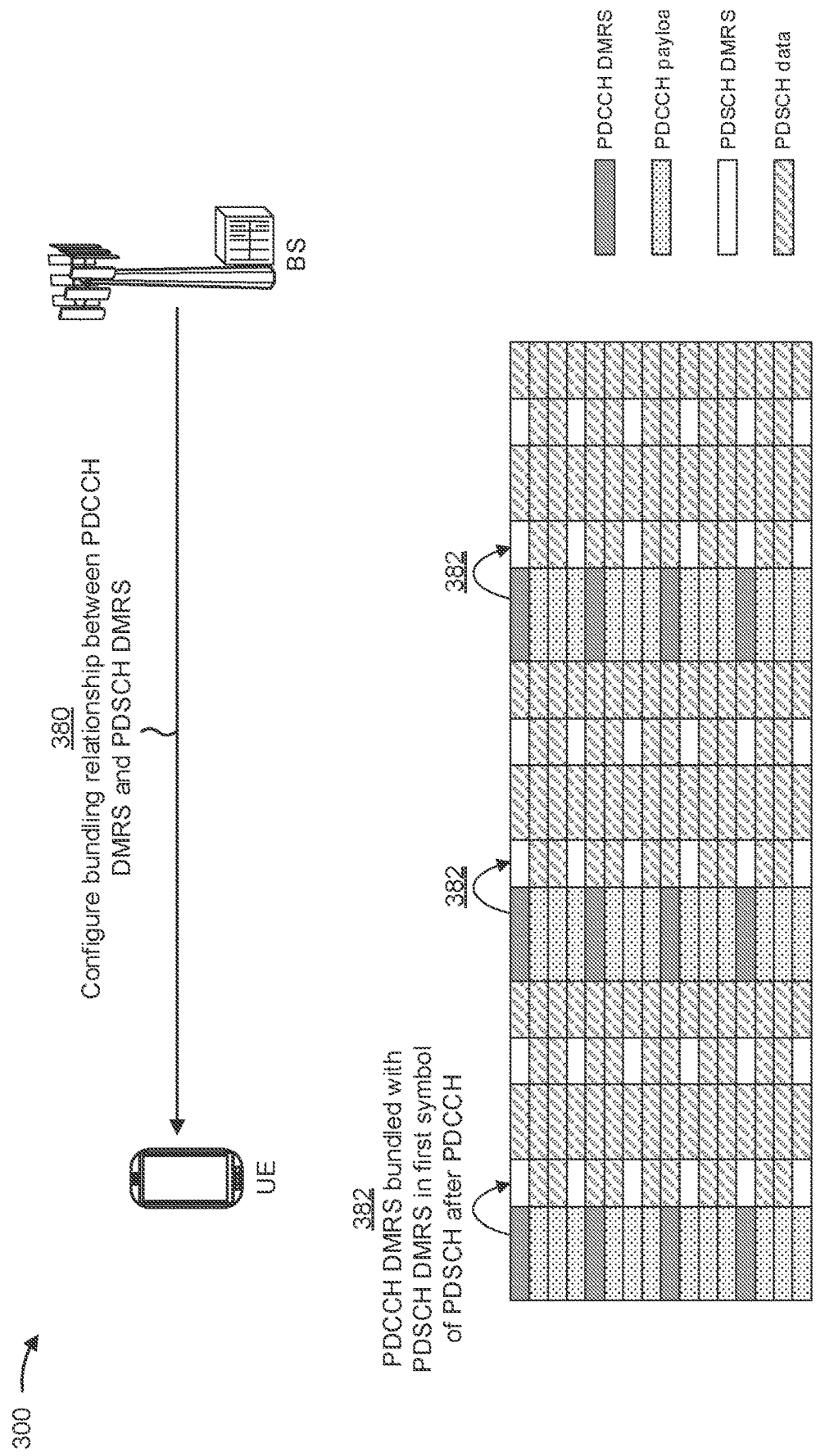

As shown in FIG. 3H, and by reference number 380, the base station may transmit, and the UE may receive, information to configure a bundling relationship between the PDCCH DMRS and the PDSCH DMRS. For example, in some aspects, the UE may support DMRS bundling between the PDCCH DMRS and a subsequent PDSCH DMRS, which may be useful for a PDCCH in a Type0-PDCCH CSS that schedules a SIB1 PDSCH in the same slot as the PDCCH in the Type0-PDCCH CSS PDCCH (e.g., when a PDCCH-to-PDSCH slot offset, $K_0$, is zero (0)). For example, as shown by reference number 382, the bundling relationship may be established between the PDCCH DMRS in a final PDCCH symbol of a PDCCH monitoring occasion and an earliest DMRS symbol of the PDSCH that follows the PDCCH monitoring occasion. Additionally, or alternatively, in some aspects, the bundling relationship may be established between the PDCCH DMRS in the first PDCCH symbol of the PDCCH monitoring occasion and a last DMRS symbol of the PDSCH that precedes the PDCCH monitoring occasion. Furthermore, in cases where a bundling relationship is configured between the PDCCH DMRS and the PDSCH DMRS, PDCCH DMRS bundling and PDSCH DMRS bundling may be enabled and configured (e.g., semi-statically, dynamically, and/or the like).

In some aspects, in cases where a PDCCH DMRS is bundled with a PDSCH DMRS (e.g., as shown in FIG. 3G and FIG. 3H), the base station may transmit the PDCCH and PDSCH with different transmit powers. Accordingly, in such cases, the base station may explicitly indicate, to the UE, a power difference between the PDCCH DMRS and the PDSCH DMRS. For example, in some aspects, the base station may indicate an energy per resource element (EPRE) offset between the PDCCH DMRS and the PDSCH DMRS that are bundled together, and the UE may receive the PDCCH DMRS and the PDSCH DMRS according to the indicated EPRE.

Furthermore, in cases where a PDCCH DMRS is bundled with a PDSCH DMRS, time domain bundling may be enabled for any suitable PDCCH and PDSCH (e.g., regardless of whether the PDSCH is scheduled by the PDCCH bundled with the PDSCH or whether the PDSCH is in the same slot as the PDCCH bundled with the PDSCH). However, as described above, a PDCCH in a Type0-PDCCH CSS and a SIB1 scheduled by the PDCCH are more likely to have the same downlink transmission parameters (e.g., precoding, matrix, beamforming filter, and/or the like). Accordingly, in some aspects, the base station may configure a time domain bundling between a DMRS associated with a PDCCH in a Type0-PDCCH CSS and a DMRS in a first symbol of a PDSCH scheduled by the PDCCH. Additionally, or alternatively, the PDCCH in the Type0-PDCCH CSS may have a one-to-one relationship with an associated synchronization signal block (SSB), which may be treated as a reference signal, whereby the base station may configure a time domain bundling between the DMRS associated with the PDCCH in the Type0-PDCCH CSS PDCCH and the SSB associated with the PDCCH monitoring occasion in which the PDCCH is transmitted.

As indicated above, FIGS. 3A-3H are provided as one or more examples. Other examples may differ from what is described with respect to FIGS. 3A-3H.

Figure 4:
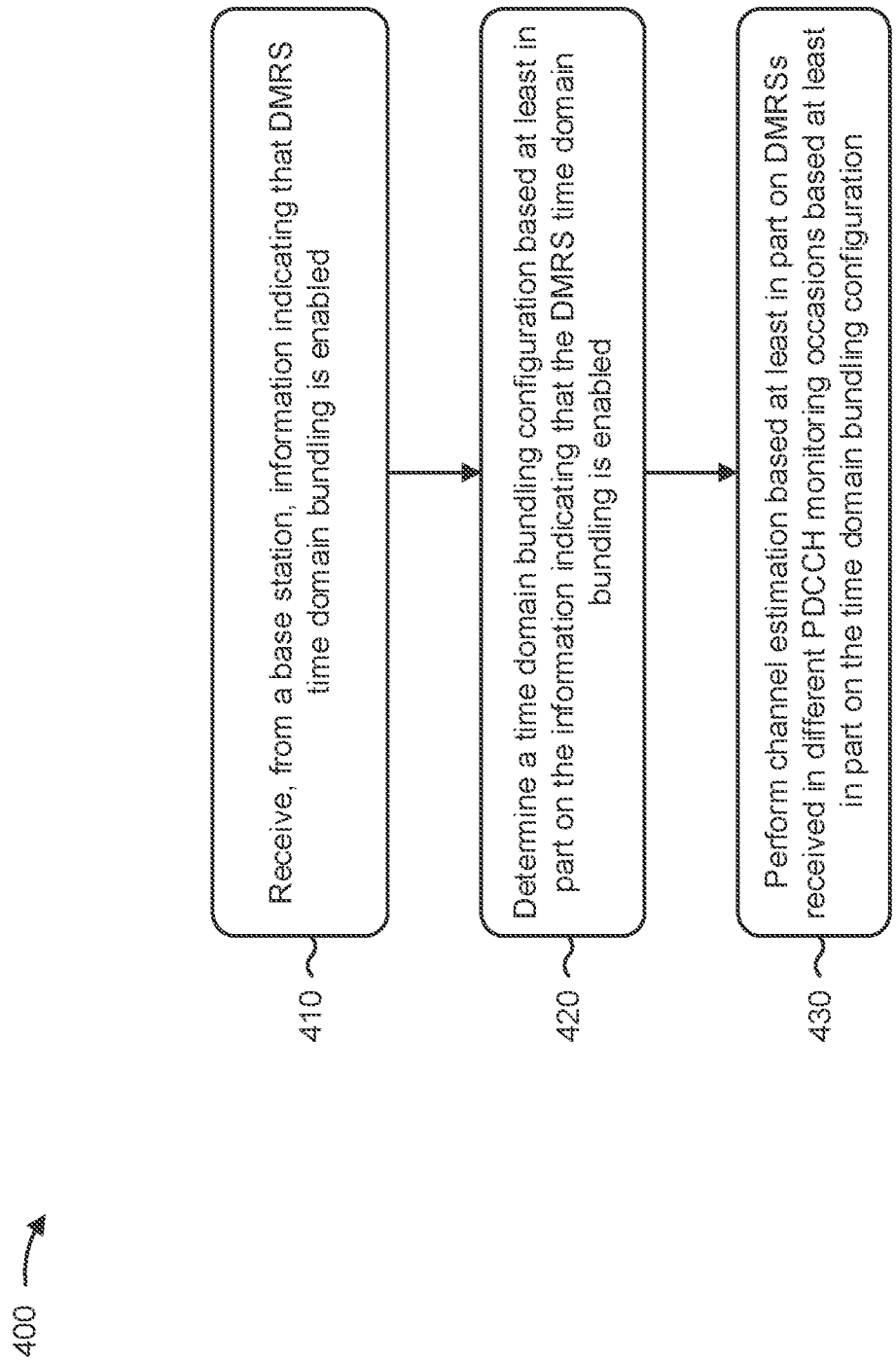
FIG. 4 is a diagram illustrating an example process performed, for example, by a UE in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with DMRS time domain bundling.

As shown in FIG. 4, in some aspects, process 400 may include receiving, from a base station, information indicating that DMRS time domain bundling is enabled (block 410). For example, the UE may receive (e.g., using antenna 252, DEMOD 254, MIMO detector 256, receive processor 258, controller/processor 280, memory 282, and/or the like), from a base station, information indicating that DMRS time domain bundling is enabled, as described above.

As further shown in FIG. 4, in some aspects, process 400 may include determining a time domain bundling configuration based at least in part on the information indicating that the DMRS time domain bundling is enabled (block 420). For example, the UE may determine (e.g., using controller/processor 280, memory 282, and/or the like) a time domain bundling configuration based at least in part on the information indicating that the DMRS time domain bundling is enabled, as described above.

As further shown in FIG. 4, in some aspects, process 400 may include performing channel estimation based at least in part on DMRSs received in different PDCCH monitoring occasions based at least in part on the time domain bundling configuration (block 430). For example, the UE may perform (e.g., using antenna 252, DEMOD 254, MIMO detector 256, receive processor 258, controller/processor 280, memory 282, and/or the like) channel estimation based at least in part on DMRSs received in different PDCCH monitoring occasions based at least in part on the time domain bundling configuration, as described above.

Process 400 may include additional aspects, such as any single aspect or any combination of aspects described below and/or in connection with one or more other processes described elsewhere herein.

In a first aspect, the time domain bundling configuration includes a permanent bundling configuration for a CSS used to schedule broadcast information in different cell-specific PDCCH monitoring occasions.

In a second aspect, alone or in combination with the first aspect, the time domain bundling configuration includes a dynamic configuration based at least in part on a field in a current PDCCH monitoring occasion that indicates whether a DMRS in a next PDCCH monitoring occasion is bundled with a DMRS in the current PDCCH monitoring occasion.

In a third aspect, alone or in combination with one or more of the first and second aspects, the field in the current PDCCH monitoring occasion further indicates a number of subsequent PDCCH monitoring occasions in which DMRSs are bundled with the DMRS in the current PDCCH monitoring occasion.

In a fourth aspect, alone or in combination with one or more of the first through third aspects, the time domain bundling configuration includes a semi-static configuration based at least in part on a periodic pattern defining a bundle including multiple PDCCH monitoring occasions in which DMRSs are bundled.

In a fifth aspect, alone or in combination with one or more of the first through fourth aspects, the DMRS time domain bundling is reset prior to an earliest PDCCH monitoring occasion in a current bundle.

In a sixth aspect, alone or in combination with one or more of the first through fifth aspects, the DMRS time domain bundling is reset prior to the earliest PDCCH monitoring occasion in the current bundle based at least in part on dynamic downlink signaling received from the base station prior to the earliest PDCCH monitoring occasion in the current bundle and/or a lack of dynamic downlink signaling indicating whether bundling is to be reset prior to the earliest PDCCH monitoring occasion in the current bundle.

In a seventh aspect, alone or in combination with one or more of the first through sixth aspects, the DMRSs in a current bundle are bundled with DMRSs in a previous bundle based at least in part on dynamic downlink signaling received from the base station prior to an earliest PDCCH monitoring occasion in the current bundle and/or a lack of dynamic downlink signaling indicating whether bundling is to be reset prior to the earliest PDCCH monitoring occasion in the current bundle.

In an eighth aspect, alone or in combination with one or more of the first through seventh aspects, the information indicating that the DMRS time domain bundling is enabled further indicates a time window in which repetitions of a PDCCH are to be transmitted, and the time domain bundling configuration includes different PDCCH monitoring occasions in the time window in which the repetitions of the PDCCH are to be transmitted.

In a ninth aspect, alone or in combination with one or more of the first through eighth aspects, the DMRS time domain bundling is reset prior to an earliest PDCCH monitoring occasion in the time window in which the repetitions of the PDCCH are to be transmitted.

In a tenth aspect, alone or in combination with one or more of the first through ninth aspects, the time domain bundling configuration includes a periodic bundling pattern that is jointly applied to the DMRS received in the different PDCCH monitoring occasions and to DMRSs received in different PDSCH monitoring occasions.

In an eleventh aspect, alone or in combination with one or more of the first through tenth aspects, process 400 includes bundling the DMRS received in at least one PDCCH monitoring occasion with an earliest symbol of a DMRS associated with a PDSCH prior to or subsequent to the at least one PDCCH monitoring occasion.

In a twelfth aspect, alone or in combination with one or more of the first through eleventh aspects, process 400 includes receiving, from the base station, information related to an EPRE offset between the DMRS received in the at least one PDCCH monitoring occasion and the PDSCH DMRS bundled with the DMRS received in the at least one PDCCH monitoring occasion, and receiving the DMRS in the at least one PDCCH monitoring occasion and the PDSCH DMRS based at least in part on the EPRE offset.

In a thirteenth aspect, alone or in combination with one or more of the first through twelfth aspects, the DMRS received in the at least one PDCCH monitoring occasion is associated with a PDCCH in a Type0-PDCCH common search space scheduling the PDSCH.

In a fourteenth aspect, alone or in combination with one or more of the first through thirteenth aspects, process 400 includes bundling the DMRS received in at least one PDCCH monitoring occasion with an SSB associated with the at least one PDCCH monitoring occasion.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
one or more memories; and
one or more processors operatively coupled to the one or more memories and individually or collectively configured to cause the UE to:
receive, from a base station, information indicating that demodulation reference signal (DMRS) time domain bundling is enabled;
determine a time domain bundling configuration based at least in part on the information indicating that the DMRS time domain bundling is enabled, wherein the time domain bundling configuration includes a dynamic configuration based at least in part on a field in a current PDCCH monitoring occasion that indicates whether a DMRS in a next PDCCH monitoring occasion is bundled with a DMRS in the current PDCCH monitoring occasion; and
perform channel estimation based at least in part on DMRSs received in different physical downlink control channel (PDCCH) monitoring occasions based at least in part on the time domain bundling configuration.

2. The UE of claim 1, wherein the time domain bundling configuration includes a permanent bundling configuration for a common search space used to schedule broadcast information in different cell-specific PDCCH monitoring occasions.

3. The UE of claim 1, wherein the field in the current PDCCH monitoring occasion further indicates a number of subsequent PDCCH monitoring occasions in which DMRSs are bundled with the DMRS in the current PDCCH monitoring occasion.

4. A user equipment (UE) for wireless communication, comprising:
one or more memories; and
one or more processors operatively coupled to the one or more memories and individually or collectively configured to cause the UE to:
receive, from a base station, information indicating that demodulation reference signal (DMRS) time domain bundling is enabled;
determine a time domain bundling configuration based at least in part on the information indicating that the DMRS time domain bundling is enabled, wherein the time domain bundling configuration includes a semi-static configuration based at least in part on a periodic pattern defining a bundle including multiple PDCCH monitoring occasions in which DMRSs are bundled; and
perform channel estimation based at least in part on DMRSs received in different physical downlink control channel (PDCCH) monitoring occasions based at least in part on the time domain bundling configuration.

5. The UE of claim 4, wherein the DMRS time domain bundling is reset prior to an earliest PDCCH monitoring occasion in a current bundle.

6. The UE of claim 5, wherein the DMRS time domain bundling is reset prior to the earliest PDCCH monitoring occasion in the current bundle based at least in part on one or more of dynamic downlink signaling received from the base station prior to the earliest PDCCH monitoring occasion in the current bundle or a lack of dynamic downlink signaling indicating whether bundling is to be reset prior to the earliest PDCCH monitoring occasion in the current bundle.

7. The UE of claim 4, wherein the DMRSs in a current bundle are bundled with DMRSs in a previous bundle based at least in part on one or more of dynamic downlink signaling received from the base station prior to an earliest PDCCH monitoring occasion in the current bundle or a lack of dynamic downlink signaling indicating whether bundling is to be reset prior to the earliest PDCCH monitoring occasion in the current bundle.

8. A user equipment (UE) for wireless communication, comprising:
one or more memories; and
one or more processors operatively coupled to the one or more memories and individually or collectively configured to cause the UE to:
receive, from a base station, information indicating that demodulation reference signal (DMRS) time domain bundling is enabled, wherein the information indicating that the DMRS time domain bundling is enabled further indicates a time window in which repetitions of a PDCCH are to be transmitted;
determine a time domain bundling configuration based at least in part on the information indicating that the DMRS time domain bundling is enabled, wherein the time domain bundling configuration includes different PDCCH monitoring occasions in the time window in which the repetitions of the PDCCH are to be transmitted; and
perform channel estimation based at least in part on DMRSs received in different physical downlink control channel (PDCCH) monitoring occasions based at least in part on the time domain bundling configuration.

9. The UE of claim 8, wherein the DMRS time domain bundling is reset prior to an earliest PDCCH monitoring occasion in the time window in which the repetitions of the PDCCH are to be transmitted.

10. The UE of claim 1, wherein the time domain bundling configuration includes a periodic bundling pattern that is jointly applied to the DMRS received in the different PDCCH monitoring occasions and to DMRSs received in different physical downlink shared channel monitoring occasions.

11. A user equipment (UE) for wireless communication, comprising:
one or more memories; and
one or more processors operatively coupled to the one or more memories and individually or collectively configured to cause the UE to:
receive, from a base station, information indicating that demodulation reference signal (DMRS) time domain bundling is enabled;

determine a time domain bundling configuration based at least in part on the information indicating that the DMRS time domain bundling is enabled;

perform channel estimation based at least in part on DMRSs received in different physical downlink control channel (PDCCH) monitoring occasions based at least in part on the time domain bundling configuration; and bundling the DMRS received in at least one PDCCH monitoring occasion with an earliest symbol of a DMRS associated with a physical downlink shared channel (PDSCH) prior to or subsequent to the at least one PDCCH monitoring occasion.

12. The UE of claim 11, wherein the one or more processors are individually or collectively configured to cause the UE to:

receive, from the base station, information related to an energy per resource element (EPRE) offset between the DMRS received in the at least one PDCCH monitoring occasion and the PDSCH DMRS bundled with the DMRS received in the at least one PDCCH monitoring occasion; and receive the DMRS in the at least one PDCCH monitoring occasion and the PDSCH DMRS based at least in part on the EPRE offset.

13. The UE of claim 11, wherein the DMRS received in the at least one PDCCH monitoring occasion is associated with a PDCCH in a Type0-PDCCH common search space scheduling the PDSCH.

14. The UE of claim 1, wherein the one or more processors are individually or collectively configured to cause the UE to:

bundle the DMRS received in at least one PDCCH monitoring occasion with a synchronization signal block associated with the at least one PDCCH monitoring occasion.

* * * * *